Patented Aug. 16, 1955

2,715,580

CEREAL COMPOSITION FOR MOIST BATTERS AND DOUGHS AND METHOD OF MAKING THE SAME

Chastain G. Harrel and Howard W. Lincoln, Minneapolis, Minn., assignors to Pillsbury Mills Inc., Minneapolis, Minn., a corporation of Delaware No Drawing. Application July 5, 1951,
Serial No. 235,374

6 Claims. (Cl. 99—94)

This invention relates to prepared food batters and doughs for the production of griddle cakes, biscuits, rolls and other types of chemically leavened doughs and batters which in home or restaurant use and in the handling and distribution prior to use are maintained in refrigeration at a temperature usually between 36 and 45 degrees Fahrenheit.

At the present time a number of completely prepared batters and doughs containing moisture are commercially sold requiring refrigeration in shipment, warehouse, storage prior to sale at retail grocers and refrigeration in the home or restaurant prior to use. Such batters and doughs utilize as the principal ingredient natural flours, usually wheat flour. Often times a period of from thirty days to ninety days elapses between preparation and packaging by the manufacturer and ultimate use by the housewife or restaurant.

During such period of shipment and storage even in refrigeration the starches of the prepared batter or dough substantially liquefy and thin resulting in soggy and unpalatable products when the material is baked. Furthermore, bacteria and mold present in small quantities when the ingredients are mixed and when the mixtures are packaged materially increase during storage and shelf periods even in refrigeration, thereby seriously and adversely affecting the palatability of the resultant product.

After rather exhaustive research and developmental work, including the use of preservatives and methods for destroying mold and bacteria as well as stifling enzyme activity, we have discovered that by substituting a reconstituted cereal composition for the natural wheat flour now forming the main ingredient of such batters and doughs, a moist or liquid product may be obtained which when handled in the normal conditions of refrigeration in shipment and storage will retain its viscosity, taste and original qualities and will be substantially free from mold over the long periods of time.

We have discovered that the thinning of such batters and doughs during refrigerated shipment and storage with the resultant sogginess and unpalatability of the baked product produced is primarily due to the enzyme activity contained in natural flours now utilized and to the presence of minute, broken starch grains susceptible to enzyme attack.

It is therefore an object of our invention to provide a comparatively inexpensive reconstituted cereal composition prepared from natural wheat flour which is substantially free from diastatic enzymes, mold and broken starch grains to the end that the viscosity and palatability of products made from batters and doughs of the class described will be substantially unchanged whether the batter or dough be baked twenty-four hours after preparation or as long as two months thereafter with the normal refrigeration applied during shipment, storage and handling.

A further object is the provision of a very simple and commercially practical method of producing such a cereal composition for liquid-containing batter and dough products.

These and other objects will be more apparent from the following description of our method and composition:

In carrying out our method, wheat flour of the desired ash content and protein content best designed for the particular product is selected. This flour is put through any one of the approved "washing" processes which washes out the glutens from the starch cells. In such washing process the diastatic enzymes are washed out of both the starch and the gluten. Furthermore, to a large extent the small fractured starch grains which are particularly susceptible to enzyme activity are also washed out and eliminated. The bacteria and mold count is likewise very materially decreased by the washing process.

After the washing process is completed, the discrete starch grains and the discrete undenatured gum gluten are dried, comminuted and thoroughly admixed to form our reconstituted cereal composition. The drying, comminuting and admixture of the washed wheat starch particles and the gluten are all carried out under conditions to avoid as far as possible introduction of bacteria and mold from surrounding air.

The resultant composition in dry, particle form is then admixed with the other ingredients of the batter or dough.

For example, if a griddle batter is to be produced such ingredients as shortening, dried eggs, dried milk solids, chemical leavening, salt and often an emulsifier are added to the reconstituted cereal composition. The desirable amount of water is then added and the mixture is thoroughly agitated to form the batter.

In the case of doughs, the necessary ingredients usually including protein foods such as eggs, shortening material, leavening, sugar, etc., with adequate moisture are mixed with our composition and the mass mechanically kneaded to the extent desired.

Our composition obtained through the washing out of the starch cells and gluten in natural wheat flour consists in almost entirely an unmodified or discrete, first-grade wheat starch and undenatured gum gluten prepared in discrete dry state and of a particle size comparable with the average particle size of natural baking flour.

It will be understood that highly satisfactory results in the preparation of wet batters or doughs may be obtained by purchasing on the commercial market unmodified discrete first-grade wheat starch which has not been dextrinized, roasted or acid treated and by purchasing discrete undenatured gum gluten. These materials are preferably obtained, packaged under partial vacuum. The relative proportions of gluten and discrete wheat starch may be very materially varied depending upon the amount of protein desired in the composition and of course in the batter or dough product all within scope of our invention. Successful pancake batters have been made and baked into pancakes with the variance in the gluten content by weight of the batter composition from less than 1 per cent up to 20 per cent.

Rather surprising results have been obtained in the utilization of relatively small amounts of our composition supplemented by proportions of natural wheat flour. We have found that in pancake, biscuit and wet dough mixes that by supplementing as low as 15 per cent of the natural wheat flour ingredients with our composition of unmodified wheat starch and undenatured gluten that the objectionable liquefying of starches and the thinning of the batters and doughs made through the periods of shipment and shelf storage are substantially eliminated. Wet batters and doughs containing as little as 22 per cent by weight of our new composition will retain substantially their original viscosity during normal refrigeration between 40 and 45 degrees F. over a period of in excess of two months.

The following formulas and proportions are merely exemplary of a wide range of proportions and ingredients which have been successfully used to prepare griddle cake batters and doughs:

*Example 1.*—Griddle cake batter (percentages by weights):

68% our composition which may vary from 0.5% to 20% gluten and from 46% to 65½% unmodified wheat starch.
12% non-fat dried milk solids.
7½% shortening.
3½% salt (NaCl).
2.1% baking powder, or equivalent leavening.
8.55% dried whole egg.
0.35% emulsifier.

The foregoing ingredients are thoroughly mixed with an equal volume of water.

Excellent results can be obtained by reducing the proportion of our new composition to from 30 to 40 per cent of the weight of the total dry ingredient mixture and supplementing the protein and wheat starch ingredients with the appropriate proportion of natural wheat flour.

*Example 2.*—Moist biscuit dough (percentages by weight):

55.4% natural wheat flour.
18.5% our composition.
16.4% hydrogenated shortening.
5.4% non-fat, dried milk solids.
3.56% baking powder or equivalent leavening.
0.67% salt.

We have found that in biscuit doughs and other comparable doughs, satisfactory results are obtained in preventing thinning of the dough when the wheat components of the mixture contained from ¼ to ⅓ by weight of our improved composition.

By the use of our composition within the wide ranges herein set forth, enzyme activity and consequent liquefying of the starches and thinning of the prepared wet batter or moist dough is so reduced that products made with our composition even when maintained at the most unfavorable of ordinary refrigeration will lose very little viscosity over keeping periods in excess of four months. Mold and increase in bacteria with the use of our constituents is so reduced that palatability is substantially affected.

It will, of course, be understood that the proportions of the undenatured gluten and unmodified, first-grade wheat starch utilized in our composition and the proportions of these ingredients relative to the other ingredients of griddle cake batters and doughs may be varied widely all within the scope of our invention.

What we claim is:

1. A prepared, moist reconstituted cereal flour composition adapted to withstand starch liquefication during storage periods, containing shortening material, a leavening ingredient and dried comminuted protein food products and including a substantial proportion by weight of a mixture of natural wheat flour and a replacement supplemental wheat flour product, said product being reconstituted and containing essentially only a mixture of dried, comminuted discrete wheat starch substantially free of diastatic enzymes of small, broken starch cells and a smaller proportion of dry, comminuted, undenatured gum gluten, said ingredients being intimately admixed with a quantity of water equal at least to the volume of said ingredients in dried state.

2. The method of preparing a moist batter and dough composition which consists in "washing out" from natural cereal flours, the diastatic enzymes contained in both the starch and gluten of the natural flour, then independently recovering in comminuted, discrete form, the starch and the gluten originally contained with the diastatic and enzymes, mold and minute starch particles removed, then thoroughly admixing the discrete starch and gluten so obtained while excluding introduction of bacteria and mold from surrounding air and adding at least an equal amount of water and a small quantity of leavening material and natural proteins to make a resultant composition which will withstand thinning and lessening of viscosity through liquefication of starch during storage periods where the product is maintained at temperatures between 35 degrees and 50 degrees F.

3. The method of preparing a moist batter and dough composition which consists in "washing out" from natural cereal flours, the diastatic enzymes contained in both the starch and gluten and the minute and broken starch cells of the natural flour, then independently recovering in comminuted, discrete form, the starch and the gluten originally contained with the diastatic enzymes, mold and minute starch particles removed, then thoroughly admixing the discrete starch and gluten so obtained while excluding introduction of bacteria and mold from surrounding air and adding at least an equal amount of water and a small quantity of leavening material and natural proteins to make a resultant composition under conditions to exclude bacteria and mold and packaging the same under partial vacuum.

4. The method as set forth in claim 2 further characterized by adding said composition under conditions to exclude introduction of bacteria and mold to a larger proportion of natural, milled cereal flour whereby objectionable liquefication of starches made through periods of subsequent shipment and shelf storage are substantially eliminated where the product is maintained at temperatures between 35 degrees and 50 degrees F.

5. A reconstituted, replacement composition for natural cereal flour for the preparation of moist batters and doughs adapted to make a resultant batter and dough which will substantially withstand starch liquefication during storage periods, said composition comprising a cereal product containing essentially only an intimate admixture of dry, discrete, comminuted, wheat starch particles substantially free of diastatic enzymes, small and broken starch cells and mold spores and a smaller proportion of dry, discrete, comminuted, undenatured gum gluten also substantially free of diastatic enzymes and mold spores.

6. A prepared, moist batter and dough composition adapted to withstand starch liquefication during storage period when maintained at a temperature between 35 degrees and 50 degrees F., comprising an intimate admixture of discrete wheat starch particles substantially free of diastatic enzymes, minute starch fragments and mold spore, dry, discrete, undenatured gum gluten particles also substantially free of diastatic enzymes and mold spores and a relatively small amount of natural, dried protein products and a leavening ingredient and water to an extent at least equal to the volume of the other ingredients in dried state.

References Cited in the file of this patent

UNITED STATES PATENTS

| 1,676,899 | Heft | July 10, 1928 |
| 2,388,902 | Callaghan | Nov. 13, 1945 |
| 2,516,117 | Harrel et al. | July 25, 1950 |
| 2,555,908 | Edeskuty et al. | June 5, 1951 |

FOREIGN PATENTS

| 251 | Great Britain | of 1859 |

OTHER REFERENCES

Batter Process for the Separation of Starch and Gluten from Wheat Flours, NRRL, Peoria, Ill., NM–269, 10 pages.